United States Patent
Keith

(10) Patent No.: US 6,706,174 B1
(45) Date of Patent: Mar. 16, 2004

(54) HOT TUB FILTER ASSEMBLY

(75) Inventor: Danny A. Keith, Morrow, OH (US)

(73) Assignee: Keith Brothers, Inc., Porte Verda Beach, FL (US)

( * ) Notice: Subject to any disclaimer, the term of this patent is extended or adjusted under 35 U.S.C. 154(b) by 0 days.

(21) Appl. No.: 10/440,536

(22) Filed: May 19, 2003

(51) Int. Cl.[7] ............................................. B01D 35/02
(52) U.S. Cl. ...................... 210/167; 210/169; 210/232; 210/416.2; 210/452; 210/489
(58) Field of Search ................................ 210/167, 169, 210/232, 416.1, 416.2, 448, 452, 488, 489

(56) References Cited

U.S. PATENT DOCUMENTS

| | | | |
|---|---|---|---|
| 3,631,987 A | * | 1/1972 | Cattano, Sr. ................. 210/452 |
| 4,233,694 A | * | 11/1980 | Janosko et al. ............... 4/541.3 |
| 4,253,959 A | * | 3/1981 | Tafara ......................... 210/232 |
| 4,349,434 A | * | 9/1982 | Jaworski ...................... 210/94 |
| 4,637,873 A | * | 1/1987 | DeSousa et al. ............ 210/169 |
| 4,743,368 A | | 5/1988 | Gates |
| 4,921,606 A | | 5/1990 | Goldman |
| 5,045,194 A | | 9/1991 | Gershenson |
| 5,624,559 A | * | 4/1997 | Levin et al. ................. 210/447 |
| 5,672,271 A | | 9/1997 | Dye |
| 6,007,714 A | | 12/1999 | Keith |
| 6,471,856 B1 | * | 10/2002 | Keith ......................... 210/167 |

* cited by examiner

*Primary Examiner*—Fred G. Prince
(74) *Attorney, Agent, or Firm*—Charles R. Wilson

(57) ABSTRACT

A filter assembly is for use in a water by-pass compartment of a hot tub. The filter assembly comprises an open-top housing and an operably associated filter basket. The housing is for placement in the by-pass compartment. A support member is positioned within the housing near its open-top. A rigid periphery found on the filter basket sits on a ledge of the support member. The filter basket is made of a water porous synthetic material. Debris is trapped on the filter basket as hot tub water is pulled through it. The filter basket is easily lifted free from the open-top housing and then cleaned if desired or simply replaced with a new filter basket.

20 Claims, 5 Drawing Sheets

HOT TUB FILTER ASSEMBLY

FIELD OF THE INVENTION

This invention relates to a filter assembly. More particularly, the invention relates to a filter assembly for use in a hot tub water by-pass compartment to filter debris from recirculating water.

BACKGROUND OF THE INVENTION

Hot tubs are very common. They were initially most commonly found in motels and rental vacation homes. Their popularity has grown and are now found in many homes. Typically, the hot tubs hold about 300 gallons to about 1,000 gallons water. They comprise a fibrous reinforced resin shell forming a water cavity and a cabinet around the shell primarily for appearance purposes. A mechanical compartment within the cabinet houses a water pump, heater, and associated equipment. A water by-pass compartment is built into the shell so as to be in water communication with the water cavity. This compartment typically holds the hot tub's water filter.

Many hot tubs are installed outdoors. In all cases, the water must first run through a filter to remove debris, including airborne material such as fallen leaves, other plant material, insects, and material brought into the hot tub by the user such as hair, lint, soap residue and body oils. Since water within the hot tub is continuously recirculated, it is essential that the water filter be long lasting, operate efficiently, be easy to clean, and/or economical to replace.

The typical hot tub has a water intake compartment which draws water from at least the surface of the hot tub water cavity. The water is often initially pulled through a skimmer basket to remove large-sized debris such as leaves and then through a filter of some nature to remove finer-sized debris. Finally, the filtered and more pure water is returned to the hot tub water cavity. Known filters for use in hot tubs include a large fluted paper filter cartridge or a set of smaller fluted paper filter cartridges operating together. Most filters, if not all, have anti-bacterial properties to maintain the water's purity. Periodically, the filter cartridge becomes clogged or ineffective and must be replaced. The task is not particularly arduous, but is time consuming. The filter cartridge must be freed from its seating, removed, discarded and a new filter cartridge installed. Needless to say, the typical hot tub owner would rather not be bothered by the needed upkeep. of more concern, there is a substantial cost associated with the fluted filter cartridge itself. Simply cleaning the filter cartridge is in theory a possibility, but in practice is very arduous and not a practical solution.

There is a need for a filter to eliminate the currently used fluted paper filter cartridge in the filter apparatus of hot tubs. In accord with a continued need for an improved filtering system, there has now been developed a filter assembly for use in the hot tub's water recirculating flow path without a need to reconfigure the hot tub itself. It is readily used in existing hot tubs. The filter assembly is easy to use and is efficient in operation. A filter used in the assembly is inexpensive enough that it can be considered disposable. Alternatively, the filter can be cleaned and reused, thereby even further reducing the hot tub's cost of operation.

SUMMARY OF THE INVENTION

A filter assembly is for use in a water recirculating flow path of a hot tub, particularly in the water by-pass compartment. The filter assembly comprises an open-top housing and a filter basket. The housing has a support member having at least one substantially horizontal ledge positioned near the open-top and also has an egress opening in a side or bottom wall for allowing water to flow through it. The filter basket is meant to be replaceable. A top edge of the filter basket rests on the ledge of the support member. The filter basket is made of a water porous synthetic fabric material. It has an open-top and a substantially rigid periphery dimensioned to fit on the support member ledge of the open-top housing. Water flows from the hot tub water cavity into the filter assembly and is returned to the hot tub water cavity in a more pure form. The assembly is very accessible. The filter basket is simply lifted from the open-top housing for replacing or cleaning purposes.

DETAILED DESCRIPTION OF THE INVENTION

Figure 1:
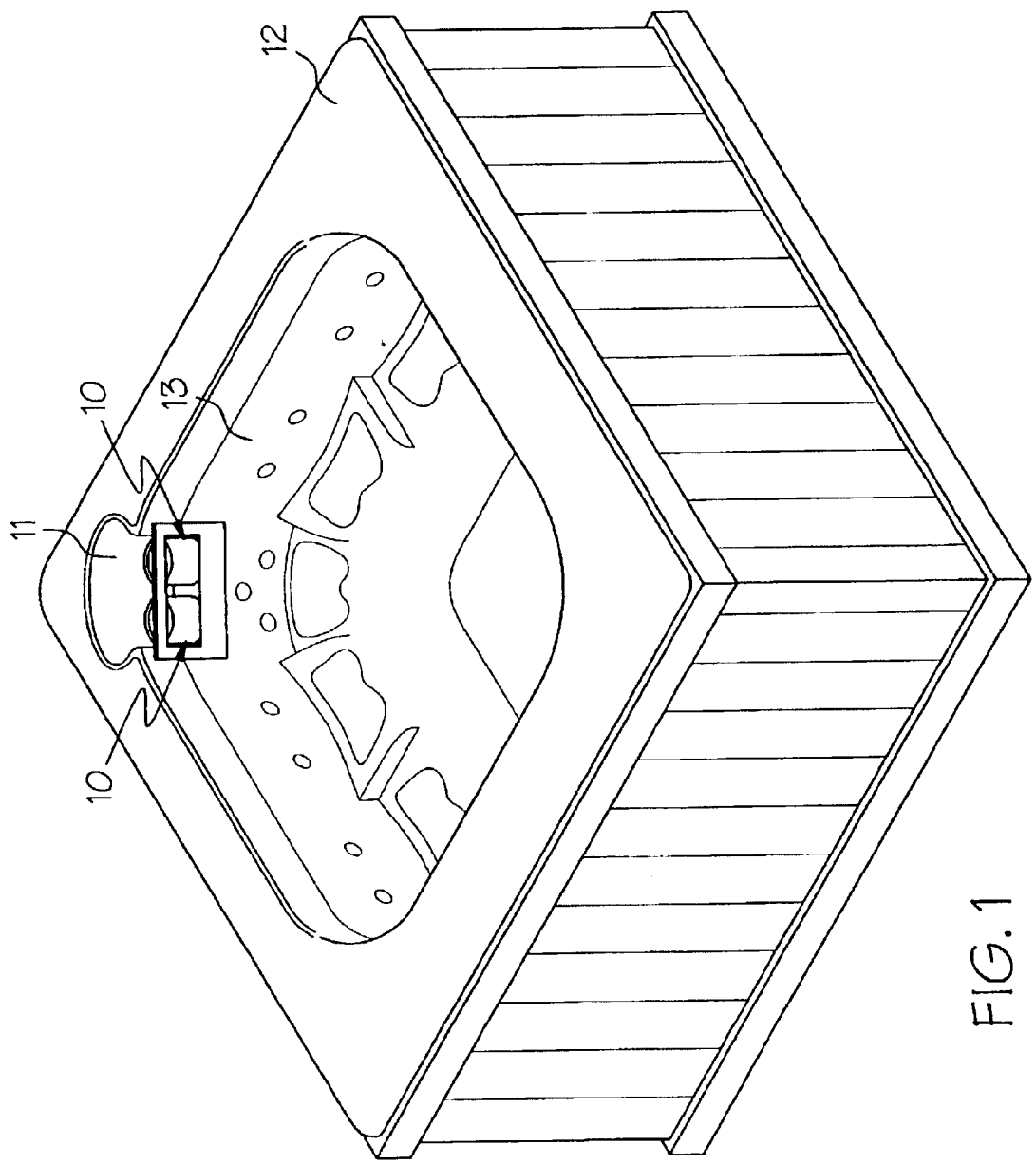
FIG. 1 is an environmental view of a hot tub showing a circulating water intake where the filter assembly of the invention is positioned in the hot tub's water by-pass compartment.

The filter assembly of the invention is described with reference to the drawings and in the following paragraphs. Typically shaped and sized hot tubs are depicted in the drawings. It should be understood that the filter assembly is useful with hot tub and spa models of differing shapes and differing capacities and also with similar structures serving the same purpose.

The hot tub depicted and described in detail has a circulating water system as part of the original equipment. A water by-pass compartment in the system provides a rigid support to, prior to the invention hereof, hold a conventional fluted filter. The filter assembly of the invention replaces the conventional fluted filter while retaining the use of the known hot tub water by-pass compartment configuration. Hot tubs having such circulating water compartments are currently of most commercial importance and all description to follow is with respect to this contemplated use.

Figure 2:
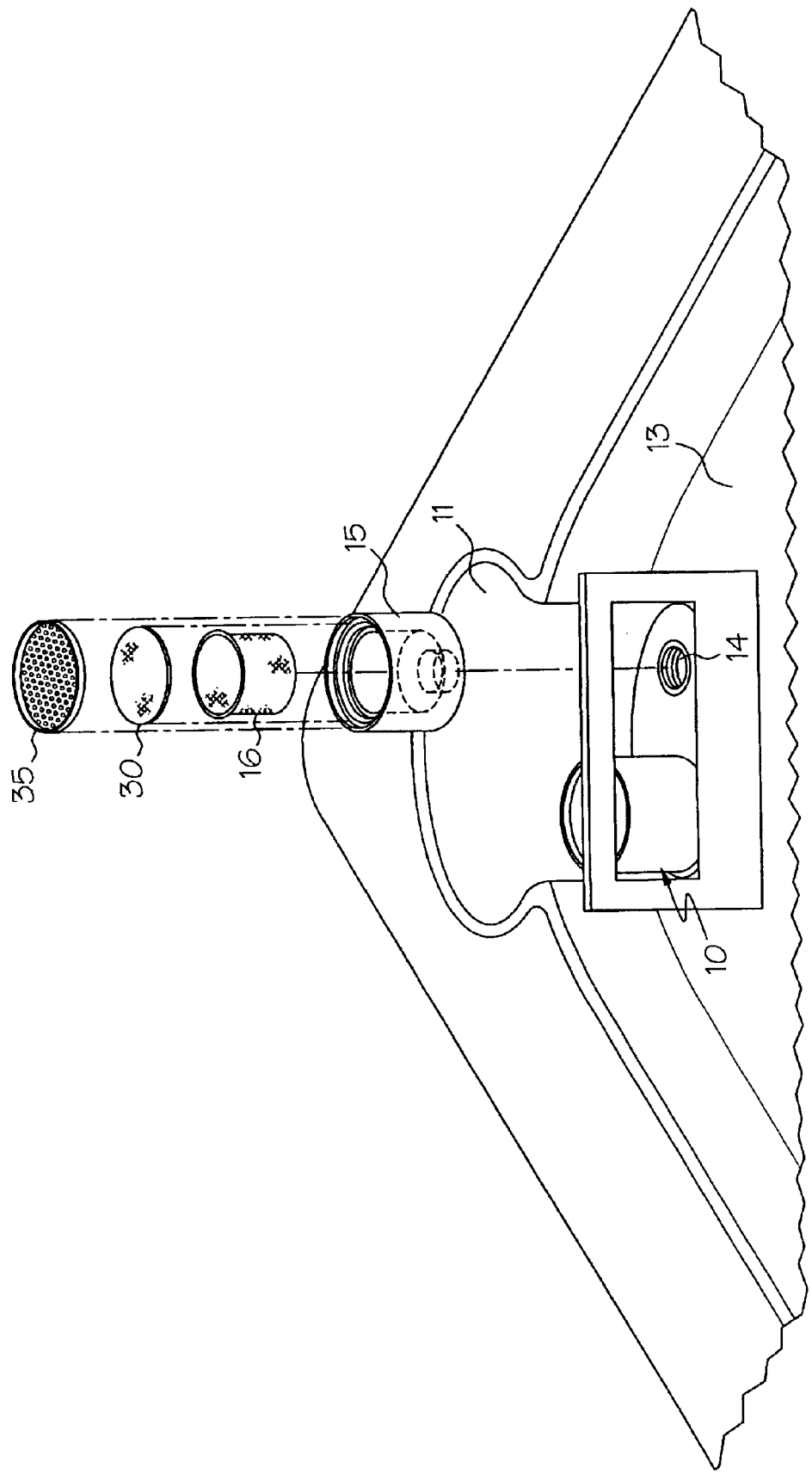
FIG. 2 is an exploded view of the filter assembly isolated from the water by-pass compartment and showing an open-top housing, a filter basket, a pre-filter and a skimmer basket.

With reference to FIGS. 1 and 2, the filter assembly 10 of the invention is intended for operable association with the water by-pass compartment 11 of the hot tub 12. The water by-pass compartment 11 as depicted is molded into the hot tub in a corner. As evident, it is configured to hold two filter assemblies. The assemblies are the same and operate in concert to filter water flowing from a hot tub water cavity 13. The compartment itself is in direct communication with water in the hot tub water cavity through a framed side wall opening. A pump (not shown) draws water into the by-pass compartment 11 and through each filter assembly 10. The filtered water enters water intake fittings 14 and is directed by piping (not shown) to water jets positioned throughout the hot tub.

Figure 3:
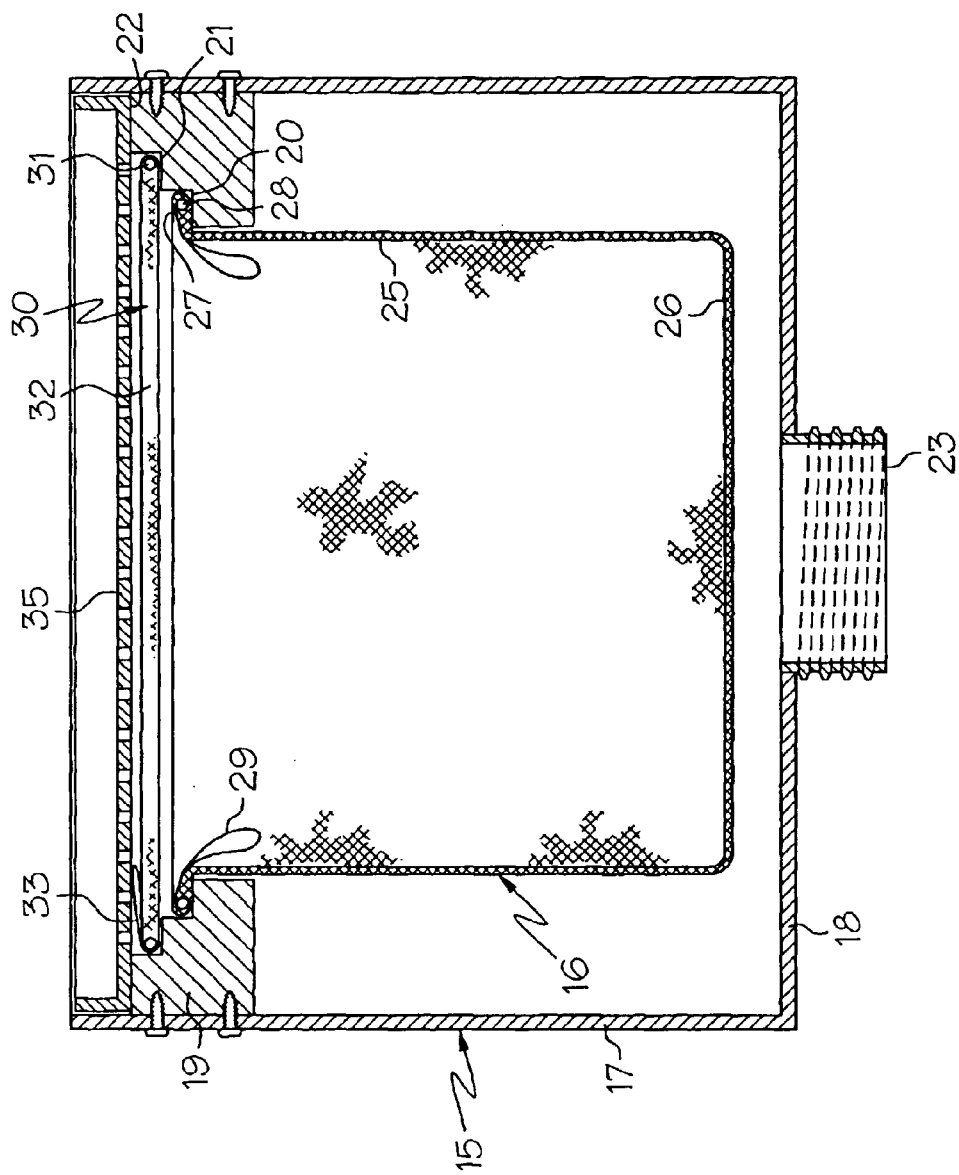
FIG. 3 is an elevational view in section of the filter assembly of FIG. 1.

Each filter assembly 10 comprises as its essential components an open-top housing 15 and a filter basket 16. The open-top housing 15 is configured to fit within the water by-pass compartment at or below water level. It is semi-permanently secured in the compartment at the water intake fitting 14. With reference to FIGS. 2 and 3, the open-top housing 15 is cylindrical-shaped with a side wall 17 and a bottom wall 18. It has a diameter of at least about three inches, preferably from about five to about twelve inches and a height of at least about five inches, preferably from about six inches to about fifteen inches. Other shaped housings are feasible, though provide no significant benefit. Dimensions of the open-top housing are dictated primarily by the size and shape of the water by-pass compartment and can vary accordingly.

A support member 19 is either molded into the side wall 17 or as best seen in FIG. 3 is attached to the side wall 17 by screws. Other attachment means such as adhesive and the like can be used. The purpose of the support member 19 is to provide a resting surface to suspend the filter basket 16 within the confines of the housing. The support member 19 extends around the interior of the housing and extends from the side wall at or near the open-top, preferably less than about three inches from the open-top. It is contiguous with the side wall fully around the side wall's circumference. An innermost inside diameter of the support member 19 is dependent on the filter basket's dimensions.

The support member has at least one substantially horizontal ledge extending around the inside to provide a resting surface to hold the filter basket and other filtering components described in detail below. The support member 19 has three substantially horizontal ledges are molded or machined into the support member 19. A filter basket ledge 20 is lowermost, a pre-filter ledge 21 is intermediate and a skimmer basket ledge 22 is uppermost. The ledges are stepped. That is, each succeeding ledge when advancing upwardly towards the open-top has a greater diameter to allow the easy placement and removal of the filtering components from above.

Necessarily, the sizes of the support member, ledges and filter basket are coordinated. Their shapes are dependent on the shape of the open-top housing. They are ideally the same, though need not be.

Still with reference to FIG. 3, the bottom wall 18 of the open-top housing 15 has an externally threaded fitting 23 extending downwardly to interact with the water intake fitting 14 in the water by-pass compartment 11. The fitting 23 provides a means for the open-top housing to be semi-permanently secured to the bottom of the by-pass compartment by a simple rotating motion.

The filter basket 16 of water porous material is configured to rest on the filter basket ledge 20 so as to be suspended within the housing 15. As best seen in FIGS. 2 and 3, the filter basket 16 is cylindrical-shaped with a curved side wall 25, a substantially flat bottom wall 26, and a top edge 27. The top edge 27 defines an open-top which provides an ingress for water and debris during use. The filter basket preferably has a diameter of about four inches to about ten inches and a height of about six inches to about twelve inches. These dimensions are conducive to the top edge 27 of the filter basket 16 contacting the ledge 20 and fitting fully into the housing. In use there is about one to three inches of head space between the bottom wall 26 of the filter basket 16 and the bottom wall 18 of the housing 15 to accommodate any stretching incurred by the filter basket.

The filter basket 16 is made of a water porous material capable of filtering out debris in the water. The porous material must allow water to pass through while retaining debris as small as 100 microns. Debris is defined to include solid materials, body oils, lotions, soap residue and other unwanted contaminates. The porous material must also have a strength to withstand the forces of the water flow through the water by-pass compartment. Examples of such porous materials include woven and non-woven synthetic fabrics such as polyester and nylon. It further is necessary that the porous material not interfere in any way with anti-bacterial systems associated with the hot tub. In particular, enzymes added to the water by the hot tub user as part of routine water maintenance must be capable of passing through the porous material. The material of the shaped filter basket has a porosity of from about 5 microns to about 100 microns, preferably from about 10 microns to about 50 microns. A non-woven synthetic polyester material having a porosity of from about 10 microns to about 20 microns is highly preferred for use in the filter basket.

The top edge 27 of the filter basket 16 has a substantially rigid periphery. The rigidity of the periphery is achieved in various manners. For example, the top edge of the filter basket can be turned over and a rigid plastic ring heat-bonded to it. Preferably, a stabilizing ring 28 is permanently secured to the top edge. optimally, the top edge of the filter basket is turned down and sewed to a side wall to trap the ring within it. The stabilizing ring 28 contacts the ledge 20 and prevents the associated filter basket from slipping further into the housing. Accordingly, the ring has an outside diameter greater than the filter basket ledge's inside diameter and less than the filter basket ledge's outside diameter. Preferably, the stabilizing ring has a diameter of from about five inches to about eleven inches.

The stabilizing ring is preferably made of stainless steel to inhibit rusting. It can as well be made of a rigid plastic or any other material having the needed strength and durability.

A set of optional handles 29 is added to the filter basket 16 to aid in its removal from the housing for cleaning or replacement purposes. With reference to FIG. 3, each handle is a short strap of fabric attached at both ends to a side wall of the filter basket near the filter basket's open-top. As should be apparent, the handles 29 lay flat along the side wall of the filter basket while water is flowing through the filter basket so as not to disrupt the water flow. To remove the filter basket, the handles are simply grasped and lifted.

Again with reference to FIGS. 2 and 3, an optional pre-filter 30 is dimensioned to fit on the pre-filter ledge 21. The pre-filter 30 comprises as its essential components a stabilizing ring 31 and a shaped filter 32. The pre-filter 30 is shallow-shaped. The filter's depth as measured from a horizontal plane defined by the stabilizing ring to its lowest point below the stabilizing ring ranges from substantially flat to about two inches. In essence, the filter is shaped to be shallow in depth.

The stabilizing ring 31 of the pre-filter 30 is similar to the stabilizing ring 28 of the filter basket 16 and is depicted as a substantially circular ring. It has a diameter sized to work cooperatively with the pre-filter ledge 21. It has an outside diameter greater than that of the inside diameter of the intermediate ledge and less than the outside diameter of the intermediate ledge. Preferably, the diameter of the stabilizing ring is about six inches to about twelve inches as determined by the particular diameters of the housing's ledges and which one is used.

The filter 32 of the pre-filter 30 is made of the same water porous material used in the filter basket 16, though necessarily has the same or a greater porosity than that of the porous material used in the filter basket. Preferably, the pre-filter's porosity is from about 15 microns to about 30 microns and the filter basket's porosity is from about 10 microns to about 20 microns, further with the pre-filter's porosity always being greater than the filter basket's porosity.

The shaped filter 32 is permanently attached to the stabilizing ring 31 by stitching. An edge of the filter is simply wrapped around the ring and stitched in place. The filter can as well be welded or melted to the ring e.g. by an ultrasound welding process. As shown, the filter 32 stretches across the stabilizing ring to form a substantially flat profile, lying in substantially the same plane as the stabilizing ring. In actual fact, the filter has a slightly depressed center area due to natural forces. An optional handle 33 is added to the filter 32 to aid in its separation and removal from the open-top housing 15 for cleaning or replacing purposes.

A conventional skimmer basket 35 can optionally be used to filter out larger debris and toys. It is a shallow rigid open-top structure typically made of plastic with holes in a bottom wall and side walls. It is sized to rest on the uppermost skimmer ledge 22. An about one-quarter inch mesh opening is typically used to filter out the large debris from flowing through subsequent filtering materials in the water flow path and permanently clogging them. Skimmer baskets typically have the same general configuration as depicted, though do differ in diameter, depth and shape depending on the hot tub manufacturer's preferences. The skimmer basket's diameter and the uppermost ledge's diameter are coordinated.

Figure 4:
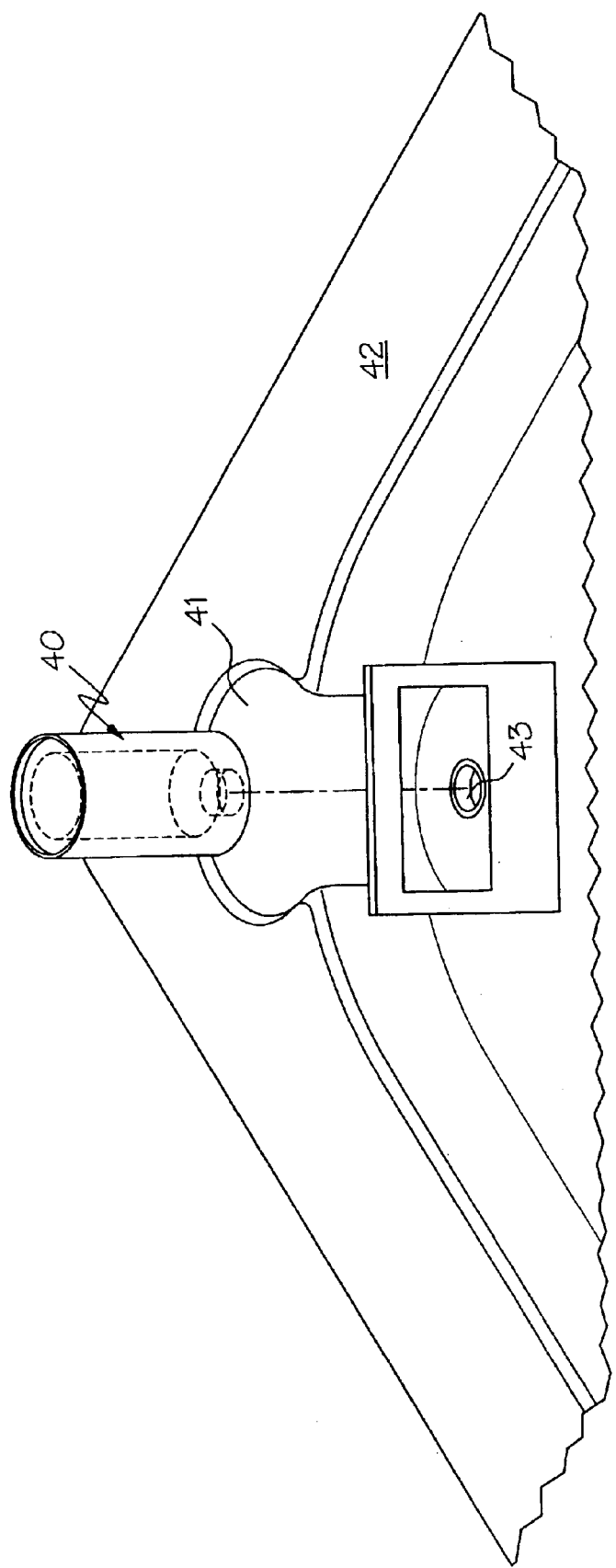
FIG. 4 is an exploded view of another filter assembly of the invention isolated from the water by-pass compartment of its hot tub.
Figure 5:
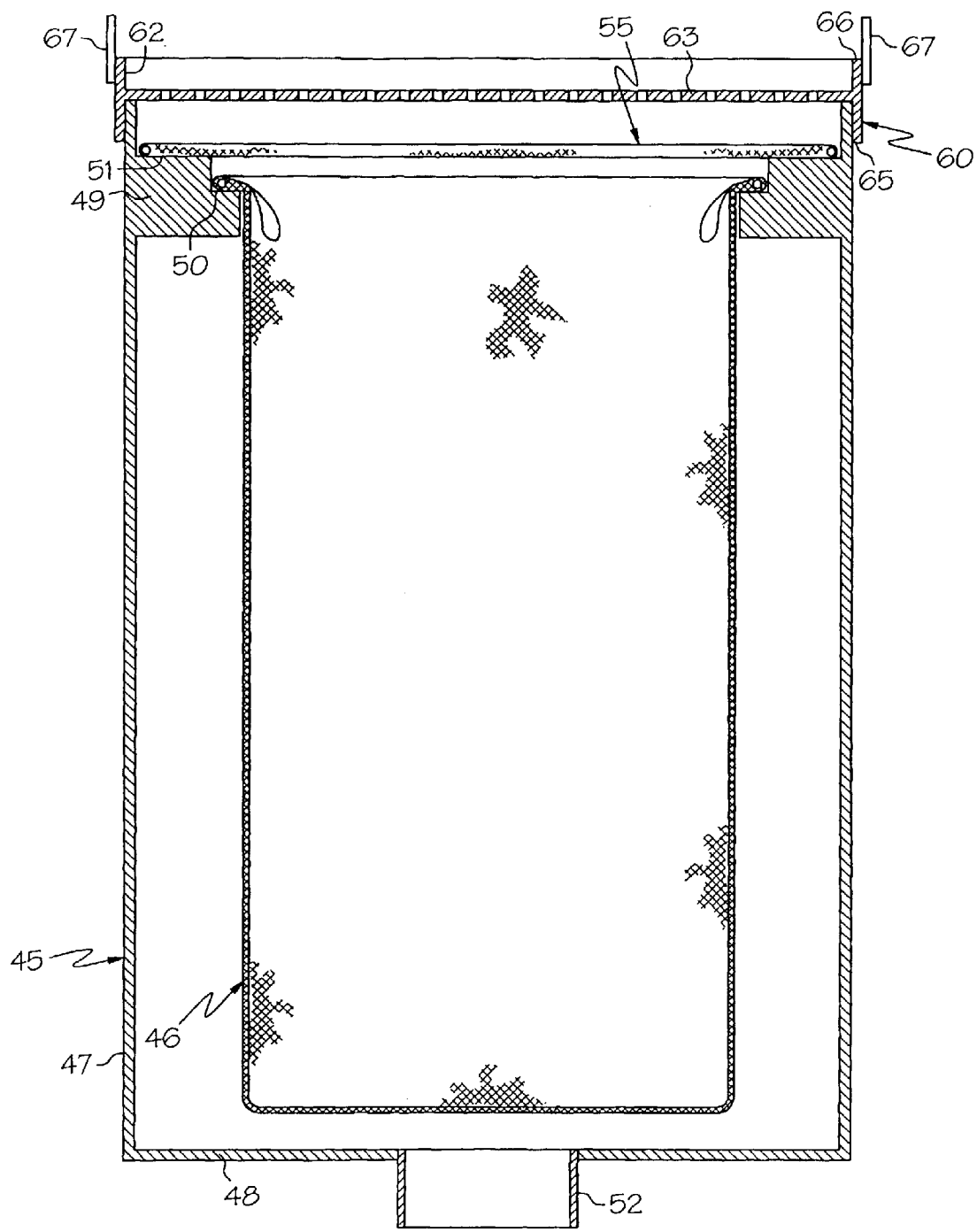
FIG. 5 is an elevational view in section of the filter assembly of FIG. 4.

FIGS. 4 and 5 depict another embodiment of the filter assembly of the invention. The filter assembly 40 is dimensioned to fit in a water by-pass compartment 41 of a hot tub 42 wherein the by-pass compartment is relatively deep and is intended to hold a single filter assembly. A fitting 43 in a bottom wall of the compartment is used to convey water back to the hot tub cavity. The filter assembly 40 comprises an open-top housing 45 and a filter basket 46 as its essential components. The housing 45 is cylindrical-shaped with a curved side wall 47 and a substantially flat bottom wall 48 and is similar to the open-top housing described with reference to FIGS. 1–3. However, the side wall 47, bottom wall 48, and support member 49 are shown as one piece, having been produced by a plastic molding process. The support member includes a filter basket ledge 50 and a pre-filter ledge 51. A slip fitting 52 extends from the housing's bottom wall 48 to provide an egress for water passing through the filter assembly. It has an outside diameter slightly smaller than the fitting 43 in the water by-pass compartment 41 and is intended to simply be slipped into it. The filter assembly's weight and water flow force are sufficient to create a secure attachment.

The filter basket 46 is dimensioned to fit within the open-top housing 45 with its rigid periphery edge resting on the filter basket ledge 50. The optional pre-filter 55 is as described above with its rigid periphery edge resting on the pre-filter ledge 51.

The filter assembly 40 further includes as a highly preferred component a skimmer basket which fits into or onto the open-top housing 45. A preferred skimmer basket 60 is dimensioned to fit over a top edge of the open-top housing 45. Its purpose is to filter out larger debris and also to ensure that a small child or pet is not partially or fully pulled into the filter basket. It is used in place of the skimmer basket conventionally used in hot tubs and included as a part of the depicted filter assembly 10 above described. The skimmer basket 60 as shown is cylindrical-shaped with a substantially vertical side wall 62 and a substantially horizontal mesh plate 63 about intermediate the skimmer basket's bottom edge 65 and top edge 66. When so positioned, the basket can be flip-flopped during use. The mesh plate 63 is preferably molded into the side wall 62, though can be separately manufactured and assembled to the side wall 62 by screws or other attachment means. The openings in the mesh plate are any shape and are at least about one-eighth inch in maximum cross-dimension and preferably range from about one-eighth inch to about one-half inch in maximum cross-dimension.

Instead of having the mesh plate molded to the side wall of the skimmer basket as depicted, a set of opposed inwardly extending tabs can be provided to fit into slots in the side wall. The tabs hold a separately manufactured mesh plate and rest on the top edge of the open-top housing 45. Further, and again with reference to FIG. 5, an optional set of vertically extending rigid finger grips 67 are molded or attached to the skimmer basket's side wall to aid in removing the skimmer basket 60 from the housing for cleaning purposes or filter basket access.

In use, the open-top housing is first secured in the hot tub's water by-pass compartment. Next, the filter basket is placed on the filter basket ledge of the open-top housing's support member. The filter basket is left in place and allowed to trap debris over several days as hot tub water is pulled through the filter assembly. Periodically, the filter basket is removed. It is cleaned simply by spraying water across or through it. The debris is easily dislodged. Alternatively, the filter basket can be discarded and a new filter basket used as a replacement. For those filter assembly embodiments allowing for one or more added filter's, the pre-filter is placed on another ledge and possibly a skimmer basket placed on an uppermost ledge to provide enhanced filtering in three stages.

Having described the invention in its preferred embodiment, it should be clear of the modifications can be made without departing from the spirit of the invention. It is not intended that the words used to describe the invention nor the drawings illustrating the same be limiting on the invention. It is intended that the invention only be limited by the scope of the appended claims.

I claim:

1. A removable filter assembly for a hot tub to separate debris from water circulating from a hot tub water cavity of the hot tub through a water by-pass system and back to the hot tub water cavity, comprising:

(a) an open-top housing having a side wall and a bottom wall for receiving water from the hot tub water cavity and for fitting into a circulating water by-pass compartment of the hot tub, wherein the open-top housing has (i) a support member extending from the side wall located near the open-top within the housing and further said support member having at least one substantially horizontal ledge, and (ii) an egress opening in the side wall or bottom wall for allowing water to flow back to the hot tub water cavity; and (b) a filter basket operably associated with the support member of the open-top housing to rest on the at least one substantially horizontal ledge so as to be suspended within the open-top housing, said filter basket made of a water porous synthetic fabric material with an open-top having a substantially rigid periphery defining the open-top and dimensioned to rest on the at least one substantially horizontal ledge, said filter basket for filtering water flowing through the open-top housing, whereby water in the hot tub water cavity passes through the open-top housing and the filter basket suspended therewithin with debris contained in the water deposited on the water porous fabric of the filter basket and further whereby the filter basket is capable of being removed by a lifting action and replaced by a dropping action.

2. The removable filter assembly of claim 1 wherein the open-top housing has solid side and bottom walls for forcing water from the hot tub water cavity to flow through the egress opening of the open-top housing.

3. The removable filter assembly of claim 1 wherein the open-top housing has two substantially horizontal ledges on the support member wherein a lowermost filter basket ledge receives the filter basket and an above positioned pre-filter ledge having a diameter greater than a diameter of the filter basket ledge and further wherein the filter assembly comprises a shallow-shaped pre-filter with a substantially rigid periphery for resting on said pre-filter ledge.

4. The removable filter assembly of claim 1 wherein the filter basket has a porosity of from about 5 microns to about 100 microns.

5. The removable filter assembly of claim 4 wherein the filter basket has a porosity of from about 10 microns to about 50 microns.

6. The removable filter assembly of claim 3 wherein the filter basket has a porosity of from about 10 microns to about 20 microns and the shallow-shaped pre-filter has a porosity of from about 15 microns to about 30 microns and further the pre-filter's porosity is greater than the filter basket's porosity.

7. The removable filter assembly of claim 6 wherein the filter basket and the shallow-shaped pre-filter are each made of a non-woven synthetic material.

8. The removable filter assembly of claim 7 wherein the shallow-shaped cleanable pre-filter is substantially flat.

9. The removable filter assembly of claim 1 wherein the open-top housing has three substantially horizontal ledges on the support member wherein a filter basket ledge is lowermost and receives the filter basket, a pre-filter ledge is intermediate and receives a shallow-shaped pre-filter made of a water porous synthetic fabric material and a skimmer basket ledge is uppermost and receives a skimmer basket.

10. A filter assembly for a hot tub to separate debris from water circulating from a hot tub water cavity of the hot tub through a water by-pass compartment and back to the hot tub water cavity, comprising:

(a) an open-top housing having a side wall and a bottom wall for receiving water from the hot tub water cavity and for fitting into the water by-pass compartment, wherein the open-top housing has (i) a support member contiguous with the side wall and located within about three inches of the open-top within the housing and further said support member having at least one substantially horizontal ledge, and (ii) an egress opening in the bottom wall for allowing water to flow back to the hot tub water cavity; and (b) a filter basket suspended within the open-top housing, said filter basket made of a water porous synthetic fabric material with an open-top having a substantially rigid periphery defining the open-top and dimensioned to rest on the at least one substantially horizontal ledge of the support member, said filter basket for filtering water flowing through the open-top housing, whereby water in the hot tub water cavity passes through the open-top housing and the filter basket suspended therewithin with debris contained in the water deposited on the water porous fabric of the filter basket and further whereby the filter basket is capable of being removed by a lifting action and replaced by a dropping action.

11. The filter assembly of claim 10 wherein the open-top housing has three substantially horizontal ledges on the support member wherein a filter basket ledge is lowermost for receiving the filter basket, a pre-filter ledge is intermediate and a skimmer basket ledge is uppermost, further wherein the filter assembly comprises a shallow-shaped pre-filter made of a water porous synthetic fabric material for resting on the pre-filter ledge and a skimmer basket for resting on the skimmer ledge.

12. The filter assembly of claim 11 wherein the filter basket has a porosity of from about 5 microns to about 100 microns.

13. The filter assembly of claim 12 wherein the filter basket has a porosity of from about 10 microns to about 50 microns.

14. The filter assembly of claim 13 wherein the filter basket has a porosity of from about 10 microns to about 20 microns and the shallow-shaped pre-filter has a porosity of from about 15 microns to about 30 microns and further the pre-filter's porosity is greater than the filter basket's porosity.

15. The filter assembly of claim 14 wherein the filter basket and the shallow-shaped pre-filter are each made of a non-woven synthetic material.

16. The filter assembly of claim 11 wherein the shallow-shaped pre-filter is substantially flat.

17. A hot tub filter assembly for separating debris from water circulating from a hot tub water cavity through a hot tub water by-pass compartment and back to the hot tub water cavity economically and simply, comprising:

(a) an open-top housing having a side wall and a bottom wall for receiving water from the hot tub water cavity and for fitting into the water by-pass compartment, wherein the open-top housing has (i) a support member contiguous with and extending from an inner side of the side wall near the open-top and further said support member having a lower most filter ledge, an intermediate pre-filter ledge and an uppermost skimmer basket ledge, further wherein each succeeding ledge when advancing upwards towards the open-top has a greater diameter than the ledge immediately below it, and (ii) an egress opening in the bottom wall for allowing water to flow back to the hot tub water cavity;

(b) a removable filter basket resting on the filter basket ledge of the open-top housing so as to be suspended within the open-top housing, said filter basket made of a water porous synthetic fabric material with an open-top having a substantially rigid periphery defining the open-top and dimensioned to rest on the filter basket ledge;

(c) a removable pre-filter resting on the pre-filter ledge of the open-top housing, said removable pre-filter having a shallow-shape and made of a water porous synthetic fabric material with a substantially rigid periphery dimensioned to rest on the pre-filter ledge; and (d) a removable skimmer basket resting on the skimmer basket ledge of the open-top housing, whereby water in the hot tub water cavity passes through the skimmer basket, pre-filter and the filter basket suspended within the open-top housing with debris contained in the water filtered therefrom and further whereby the skimmer basket, pre-filter and filter basket are all individually and successively removed by a lifting action and replaced by a dropping action.

18. The filter assembly of claim 17 wherein the filter removable basket has a porosity of from about 10 microns to about 20 microns and the shallow-shaped removable pre-filter has a porosity of from about 15 microns to about 30 microns and further the pre-filter's porosity is greater than the filter basket's porosity.

19. The filter assembly of claim 18 wherein the removable filter basket and the shallow-shaped removable pre-filter are each made of a non-woven synthetic material.

20. The filter assembly of claim 17 wherein the removable filter basket and the removable pre-filter each has a handle for grasping and seperating from the open-top housing.

* * * * *